United States Patent
Gottfried

(10) Patent No.: US 8,759,992 B1
(45) Date of Patent: Jun. 24, 2014

(54) SPHERICAL MECHANICAL ENERGY ACCUMULATOR

(76) Inventor: Mario H. Gottfried, Mexico D.F. (MX)

( * ) Notice: Subject to any disclaimer, the term of this patent is extended or adjusted under 35 U.S.C. 154(b) by 245 days.

(21) Appl. No.: 13/397,032

(22) Filed: Feb. 15, 2012

Related U.S. Application Data

(60) Provisional application No. 61/445,697, filed on Feb. 23, 2011.

(51) Int. Cl.
*H02K 7/02* (2006.01)

(52) U.S. Cl.
CPC .............. *H02K 7/02* (2013.01); *Y02T 10/6204* (2013.01)
USPC .............................. 290/1 R; 290/1 A; 290/15

(58) Field of Classification Search
USPC ............................................ 290/1 A, 1 R, 15
See application file for complete search history.

(56) References Cited

U.S. PATENT DOCUMENTS

| | | | |
|---|---|---|---|
| 4,498,015 A | 2/1985 | Gottfried | |
| 6,232,671 B1 | 5/2001 | Gottfried | |
| 7,900,874 B2 * | 3/2011 | Fiala et al. | 244/171.5 |
| 8,234,943 B2 * | 8/2012 | Peng et al. | 74/5.37 |
| 2012/0234981 A1 * | 9/2012 | Nagabhushan et al. | 244/165 |

* cited by examiner

*Primary Examiner* — Tho D Ta
(74) *Attorney, Agent, or Firm* — Egbert Law Offices, PLLC

(57) ABSTRACT

A mechanical energy accumulator has a housing, a first pair of flywheels rotatable about a first axis within the housing, a second pair of flywheels rotatable about a second axis within the housing, and a third pair of flywheels rotatable about a third axis within the housing. Each flywheel of the first pair of flywheels being rotatable in opposite directions, each flywheel of the second pair of flywheels being rotatable in opposite directions and each flywheel of the third pair of flywheels being rotatable in opposite directions. The first, second and third axes are perpendicular to each other. An energy input is cooperative with at least one of the flywheels for supplying electrical energy so as to rotate the flywheel. An energy output is also provided for converting the rotation of the flywheels into potential energy. Each of the flywheels has a double conical shape.

12 Claims, 2 Drawing Sheets

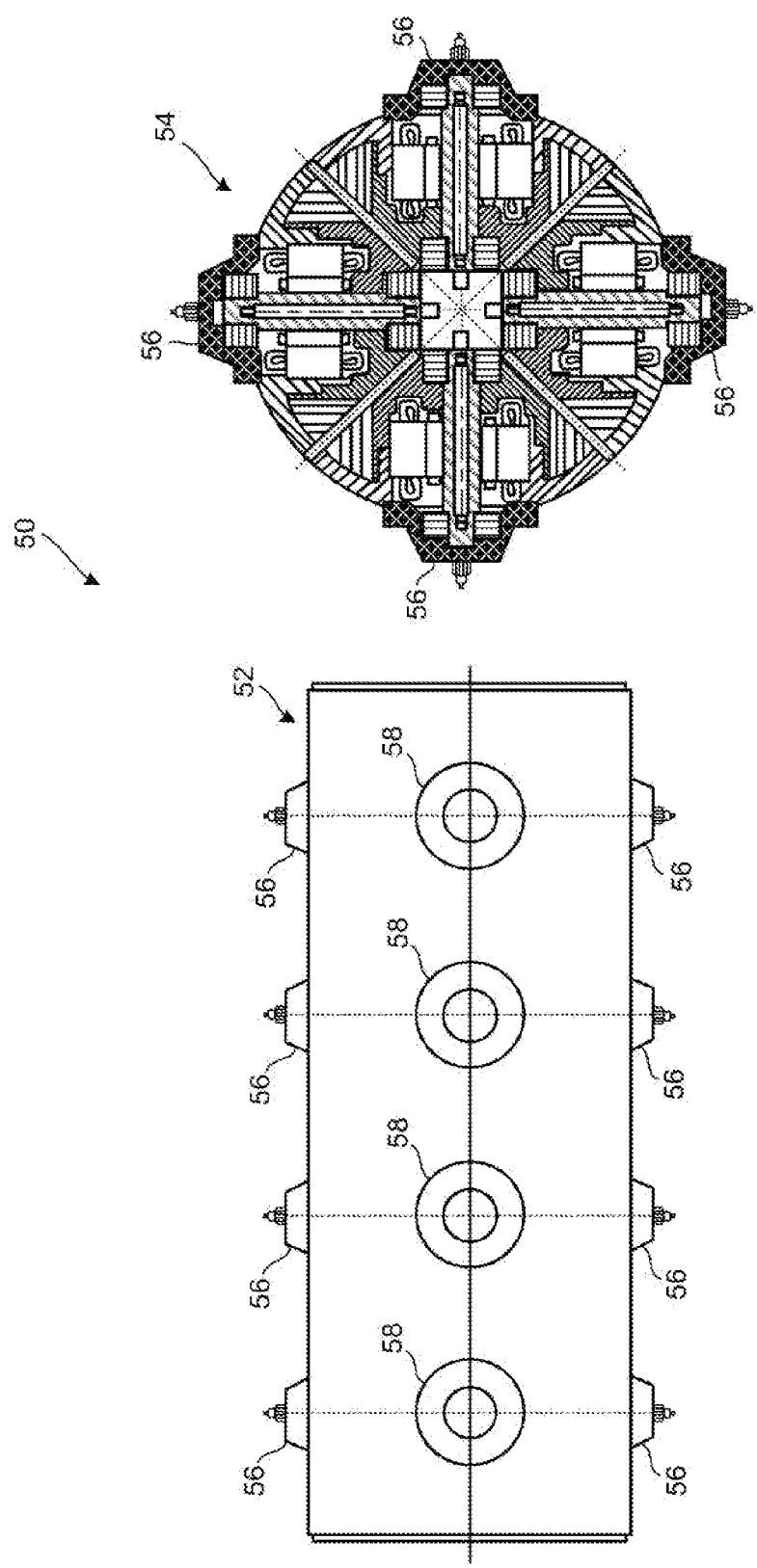

SPHERICAL MECHANICAL ENERGY ACCUMULATOR

RELATED U.S. APPLICATIONS

The present application claims priority from U.S. Provisional Patent Application No. 61/445,697, filed on Feb. 23, 2011, presently pending.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to kinetic energy storage systems for use in moving vehicles. More particularly, the present invention relates to energy storage systems utilizing an arrangement of three counter-rotating pairs of electro-mechanical flywheels for reducing and minimizing gyroscopic effects upon the moving vehicle.

2. Description of Related Art Including Information Disclosed Under 37 CFR 1.97 and 37 CFR 1.98

While flywheels are well known in the art, there has been very little application of flywheels in moving vehicles. Some flywheels have been used in automobile engines to smooth out the pulses of energy provided by the exploding gases in the cylinders and to provide energy for the compression stroke of the pistons. However, flywheels have seldom been used for storage of kinetic energy within the automobile.

The reason for the lack of usage of flywheels as kinetic energy storers in automobiles has been the gyroscopic effect of the flywheel upon the maneuverability of the vehicle. A spinning flywheel produces a strong gyroscopic effect; in other words, the flywheel strongly opposes the turning of the vehicle. This gyroscopic effect is magnified where the flywheel is either large or spinning at high speeds.

It is highly desirable to utilize flywheel systems to store kinetic energy in moving vehicles since they can be loaded and energy drawn many times. For example, a train equipped with a kinetic energy storing flywheel could conserve a significant portion of that energy which was lost upon stopping the train. Similarly, the energy wasted in stopping an automobile could also be conserved and applied to accelerating the automobile or supplying the automobile with electrical power. Such a kinetic energy storage system could have vast applications in the fields of electric automobiles, hybrid automobiles, or other electrically powered vehicles.

The gyroscopic effect of a single flywheel arrangement clearly prohibits its widespread use as a kinetic energy storer in vehicles. If a single flywheel system were used to store much of the kinetic energy lost during the stoppage of a train, then the gyroscopic effect of the spinning flywheel could cause a train to derail every time it would go around a curve. Thus, it would be desirable to use a flywheel kinetic energy storing system without having to endure the undesirable characteristics of the gyroscopic effect.

One significant effort to achieve these benefits was found in U.S. Pat. No. 4,498,015, which issued on Feb. 5, 1985, to the present inventor. This device was a flywheel device for a moving vehicle that comprised a plurality of flywheel systems connected in such a manner as to minimize the gyroscopic effects of the flywheels. The flywheels were arranged such that they spin in axes that are ninety degrees from each other. In one embodiment of the invention, this was accomplished by attaching each flywheel to a separate shaft extending through opposing sides of a closed container. One shaft extends from the top to the bottom, another from side to side along the length of the enclosure, and the third from side to side along the width of the enclosure. Each of the shafts is freely rotatable within a ball bearing arrangement mounted in each side of the enclosure. The shafts are geared into one another such that the equally sized flywheels will spin at the same rate. This patent further proposed an alternative embodiment in which each of the flywheels was the rotor in an electric motor. The flywheel-rotor included integrated windings, magnets, and stator cores. Additionally, other techniques can be used such as hydraulic motor generators or pneumatic motor generators. The axes of these motors are arranged so as to be ninety degrees from each other. The electric motors were rigidly attached at a central area between them.

Unfortunately, this arrangement of flywheels was often difficult to configure so that all of the gyroscopic effects were eliminated. After a great deal of experimentation, it was found that the rotational movement of the flywheel, along each of the axes, still contributed gyroscopic effects. As such, a solution needed to be found as to how the minimize the gyroscopic effects along each axis.

In U.S. patent application Ser. No. 08/304,520, filed on Sep. 12, 1994, by the present inventor, and entitled "FLYWHEEL ENERGY STORAGE APPARATUS", now abandoned, a system was described which minimizes gyroscopic effects from the rotational movement of the flywheels. In particular, this system is an energy storage apparatus that has a housing, a pair of flywheels rotatable about a first axis within the housing, a second pair of flywheels rotatable about a second axis within the housing, a third pair of flywheels rotatable about a third axis within the housing, and an energy input means connected to at least one of the flywheels for initiating and maintaining rotational movement of the flywheels. An output energy device serves to convert the rotation of the flywheels into potential energy. Each of the first pair of flywheels rotates in opposite directions. Each of the second pair of flywheels is rotatable in opposite directions. Finally, each of the third pair of flywheels is rotatable in opposite directions. Each of the axes of the flywheel pairs are perpendicular to each other.

In this system, the energy input means was a motor-generator connected to each of the flywheels of the first, second and third pairs. Each of the flywheels has a shaft which extends centrally therefrom. The shaft is rotatable with the rotation of each of the flywheels. The motor-generator is connected to the shaft. In this system, the housing has a configuration of a sealed cube. Each of the flywheels is located adjacent a side of the cube. The housing has an interior which is maintained in a vacuum condition.

After experiments with that invention, it was found that these inventions strongly minimized the gyroscopic effects of the flywheels in the system. However, in actual use, there was the danger of injury caused by the flywheels spinning at a high speed. Under certain circumstances, in the event of an automobile accident or a collision when the flywheel disintegrates or bursts, pieces of the flywheel could come off of the spinning flywheel. The high speed at which the flywheel rotated created a dangerous condition whereby the flying pieces became the equivalent of flying shrapnel. As such, a need developed so as to create such an energy storage apparatus in which each of the flywheel components would automatically brake in the event of a collision.

It is further noted that with these prior systems, it is important to be able, under certain circumstances, to absorb the energy produced by such an apparatus. Adverse effects could be created by rigidly and fixedly mounting the housing of such an energy storage apparatus directly to a vehicle. The strong forces imparted by such a device could damage the structural integrity of the vehicle. Additionally, the flywheels housed in a cubic frame, when used in vehicles, are subject to possible disintegration or damage due to road shock and vibration. Such road shocks and vibrations must be absorbed in order to reduce any threat of damage to the flywheels, especially at higher vehicle and flywheel speeds. As such, a need developed so as to be able to reduce the shock and fatigue caused by the energy from road vibration and the shocks of bumps, holes and rocks as received by the vehicle during the normal driving movement of the vehicle.

U.S. Pat. No. 6,232,671, issued on May 15, 2001 to the present inventor, describes such a flywheel energy storage apparatus with a braking capability. Additionally, the patent addressed the problems of shock and fatigue, as well as the danger of shrapnel. The apparatus is designed for a vehicle that has a housing resiliently mounted in the vehicle. The apparatus has thee pluralities of flywheels rotatable about separate axes within the housing. There is an energy input mechanism connected to one of the flywheels for initiating and maintaining rotational movement of the flywheels. An output mechanism converts the rotation of the flywheels into potential energy. Each of the flywheels of the first, second and third pairs are rotatable in opposite directions. Each of the axes are perpendicular to each other. A cradle is connected to the vehicle so as to receive the housing within the cradle. The flywheel system is designed to be safe, yet portable, as an electro-mechanical battery. The housing is in the shape of a cube. The housing has a braking capability, and is designed so as to reduce the amount of shrapnel released in the event of an accident. The integrity of the flywheel system was accomplished through the use of a stainless steel mesh formed around the housing. Additionally, a latex layer was formed beneath the stainless steel mesh, which added to both the strength and flexibility of the flywheel system.

It is an object of the present invention to provide an energy storage apparatus which reduces and minimizes gyroscopic effects.

It is another object of the present invention to provide a long life energy storage apparatus that can be utilized within vehicles without diminishing the maneuverability of the vehicle.

It is another object of the present invention to provide an energy storage apparatus that allows for the production of electrical energy, rather than mechanical energy.

It is yet another object of the present invention to provide a flywheel energy storage apparatus which minimizes interior friction.

It is a further object of the present invention to provide a flywheel energy storage device which reduces the potential for damage and destruction in the event of an accident or in the event of a damaging occurrence.

It is still a further object of the present invention to provide a flywheel energy storage apparatus which reduces the effect of road shock and vibration upon the flywheel system.

It is another object of the present invention to provide a flywheel system which operates with other flywheel systems, other batteries or other engines.

These and other objects and advantages of the present invention will become apparent from a reading of the attached specification and appended claims.

BRIEF SUMMARY OF THE INVENTION

The present invention is mechanical energy accumulator having a housing, a first pair of flywheels rotatable about a first axis within the housing, a second pair of flywheels rotatable about a second axis within the housing, and a third pair of flywheels rotatable about a third axis within the housing. Each flywheel of the first pair of flywheels being rotatable in opposite directions, each flywheel of the second pair of flywheels being rotatable in opposite directions and each flywheel of the third pair of flywheels being rotatable in opposite directions. The first, second and third axes are perpendicular to each other.

In the present invention, an energy inputting means is cooperative with at least one of the flywheels for supplying electrical energy so as to rotate the flywheel. An energy outputting means is also provided for converting the rotation of the flywheels into potential energy. The housing has openings thereon corresponding respectfully to locations of each of the flywheels. A plurality of lids are positioned on the housing respectfully over the openings. Each of the plurality of lids have stator windings on an interior thereof. Each of the flywheels have rotors formed thereon, the rotors being cooperative respectfully with the stator windings. Each of the flywheels may have a double conical shape.

The mechanical energy accumulator may also have a vacuum valve positioned on an outside of the spherical housing, the vacuum valve being in communication with an interior of the housing, and suitable for allowing a vacuum to be created within the housing. A support structure may be formed interior of the housing and a convergence support may be formed at a center of the housing. The support structure can be connected to the convergence support and to an interior surface of the housing. The support structure forms a frame around each of the flywheels.

In the present invention, each of the flywheels may have a double conical shape wherein a diameter of each of the flywheels increases from a position adjacent the convergence support towards an exterior of the housing, the diameter decreasing toward said housing.

The present invention is also a flywheel system having a housing having a plurality of openings thereon, a plurality of flywheels respectfully positioned in the plurality of openings. Each of the plurality of flywheels having rotors formed thereon adjacent an exterior surface of the housing. A plurality of lids are positioned respectfully over the plurality of openings. Each of the plurality of lids may have stator windings on an interior side thereof. The stator windings are cooperative respectfully with the rotors. The plurality of flywheels may include a first pair of flywheels rotatable about a first axis within the housing, a second pair of flywheels rotatable about a second axis within the housing and a third pair of flywheels rotatable about a third axis within the housing. The first, second and third axes are perpendicular to each other.

In another embodiment of the present invention, the flywheel system includes a pipe having openings formed along a diameter thereof. A plurality of flywheel units are positioned within the pipe. Each of the plurality of flywheel include a first pair of flywheels rotatable about a first axis within the pipe, a second pair of flywheels rotatable about a second axis within the pipe, and a third pair of flywheels rotatable about a third axis within the pipe. The first, second and third axes are perpendicular to each other. Each of the flywheels have bearing mounts thereon exposed to an exterior of the pipe respectfully through the openings of the pipe. Each of the flywheels may have a brushless DC motor thereon. The brushless DC motor may have permanent magnet rotors.

BRIEF DESCRIPTION OF THE SEVERAL VIEWS OF THE DRAWINGS

FIG. 3 is a schematic view of an alternative embodiment of the present invention.

DETAILED DESCRIPTION OF THE INVENTION

Figure 1:
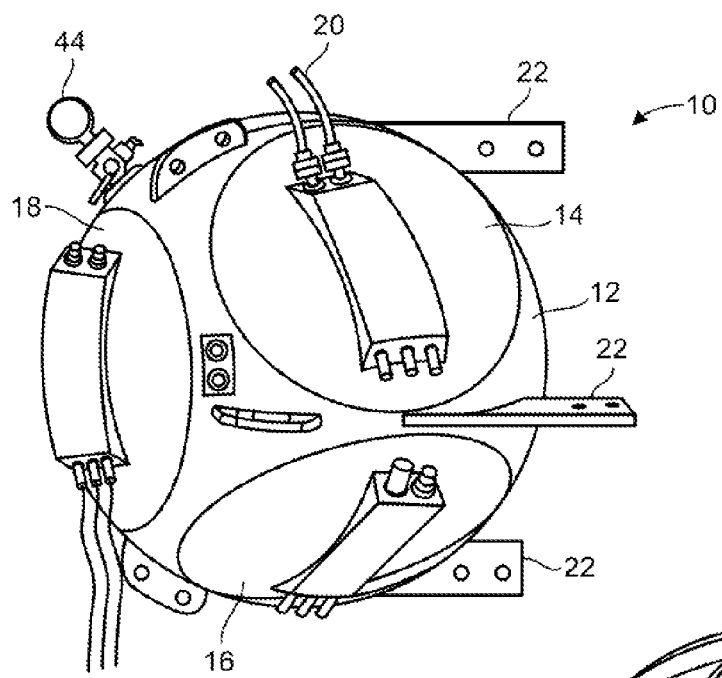
FIG. 1 is a perspective view of the mechanical energy accumulator of the present invention.

Referring to FIG. 1, there is shown the mechanical energy accumulator 10 of the present invention. The mechanical energy accumulator 10 has a generally spherical-shaped housing 12. First flywheel lid 14, second flywheel lid 16, and third flywheel lid 18 are affixed to the exterior of the housing 12. Each of these flywheel lids covers flywheels that are located internally of the spherical housing 12. These flywheels are shown in more detail in FIG. 2. The housing 12 has a configuration of a sealed sphere or ball. Three other flywheel lids are affixed to the spherical housing 12, but are not shown in FIG. 1. Each of the lids 18 is designed to be tight fitting, and secured with a winding of cable or steel, further using glue or latex rubber for absolute fail safe sealing.

Each of the flywheel lids 14, 16, and 18 are shown having cooling lines 20 in communication with an interior thereof. The water cooling lines 20 provides for the circulation of water around the system so as to appropriately cool the flywheels as they rotate on the interior of housing 12. Brackets 22 extend outwardly from the spherical housing 12 and are used to connect the mechanical energy accumulator 10 to the interior of the vehicle.

The interior of the housing 12 should be in a vacuum condition so as to minimize any friction through the rotation of the flywheels within the interior of the housing 12. This vacuum condition can be created by the use of a commercial vacuum pump acting on the interior of the housing 12. A vacuum valve 44 is shown exterior of the spherical housing 12 and may be connected to such a vacuum pump. A vacuum line also extends into the interior of the housing 12 so as to appropriately maintain cooling to the bearings, magnetic and motors in a vacuum condition.

The housing 12, along with its associated components, is to be positioned within the interior of a vehicle. The mechanical energy accumulator 10 of the present invention is contemplated for use in conjunction with a bus. However, all vehicles or vessels can be included, including spacecraft. The mechanical energy accumulator 10 of the present invention would work best in space due to the vacuum condition of space itself.

Figure 2:
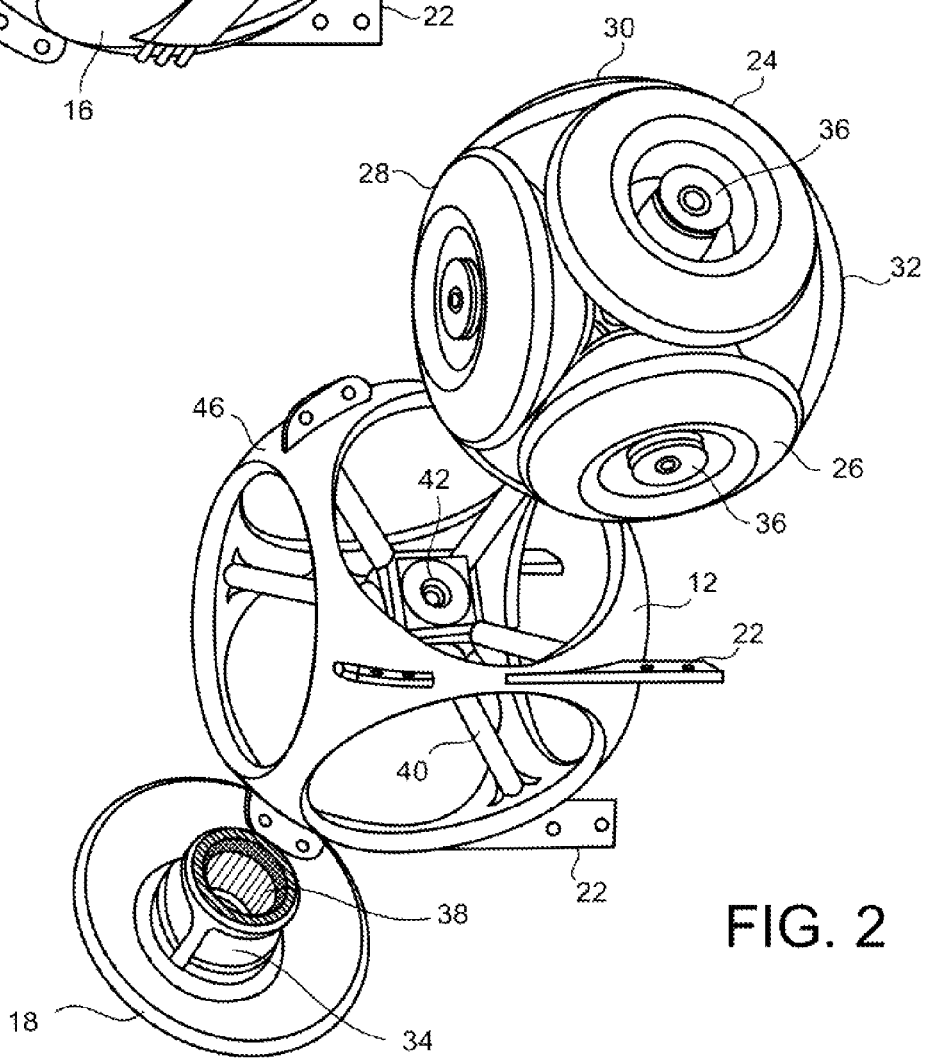
FIG. 2 is an exploded view of the mechanical energy accumulator of the present invention.

Referring to FIG. 2, there is shown an exploded view of the mechanical energy accumulator 10 of the present invention. The three pairs of flywheels are shown in a ball configuration. There is shown the first flywheel 24, a second flywheel 26 and a third flywheel 28. Below the flywheels is shown the spherical housing 12. The spherical shape of the housing 12 allows for a more efficient use of the volume of the mechanical energy accumulator 10. With the flywheels formed in a double-conical configuration, most of the space within the housing 12 is utilized. Each of the flywheels has a lower cone section which converges toward the center of the housing 12, and an upper cone section which follows the curved wall of the housing 12.

An inner support structure 40 maintains the structure of the housing 12 and the housing wall 46. A convergence support 42 is shown in the center of the spherical housing 12. The convergence support 42 is at a point where the ends of the flywheels meet in the center of the spherical housing 12. The convergence support defines the axes about which the pairs of flywheels rotate.

Also shown in FIG. 2 is the third flywheel lid 18. The structure of the third flywheel lid 18 is essentially identical to the other flywheel lids shown in FIG. 1. There are six flywheel lids in total which cover each of the flywheels and are affixed flush with the housing wall 46 of the spherical housing 12. In the center of the flywheel cap 18, there is shown the motor 34 of the mechanical energy accumulator 10 of the present invention. Attached to the flywheel cap 18 are the stator windings 38 of the motor 34. Each of the flywheel caps may have identical motors 34 and stator windings 38. The stator windings 38 of the motor 34 interact with each of the rotors 36 found on each of the flywheels. The rotors 36 are situated within the stator windings 38 of the motor 34. The motor 34 can be used to initiate the rotation of each of the flywheels, and also to capture energy from the rotating flywheels.

In the present invention, a sphere of flywheels is contemplated. As such, in FIG. 2, it can be seen that each of the flywheels 24, 26 and 28 rotate about axes which are perpendicular to each other. In the concept of the present invention, flywheels can also face the other sides of the housing 12. In other words, another flywheel will face the back side of housing 12 opposite the flywheel 24. A flywheel 30 will face the side opposite flywheel 26. Another flywheel 32 will face the housing 12 opposite flywheel 28. The flywheel 24 and the opposing flywheel on the other side of the housing 12 will rotate about the same axis but will rotate in opposite directions. The flywheel 26 and the flywheel 30 on the opposing side of housing 12, will rotate about the same axis but will rotate in opposite directions. Finally, the flywheel 28, and the flywheel 32 on the opposite side of the housing 12 will rotate about the same axis but in opposite directions. These flywheels, opposite each other on the same axis, turn in the opposite direction so as to achieve the gyro-neutral characteristics obtained in a three-dimensional configuration. Counter-rotating flywheels are known to neutralize certain gyroscopic effects on the same plane. The mechanical energy accumulator 10 serves to make gyro-neutral all movement aspects of the entire assembly. The gyro-effects are transferred to the enclosure, to the bearings, and to the shafts of each plane of flywheel axis. As a result, a vehicle connected to the mechanical energy accumulator 10 will be free of gyro-limitations.

Although not shown in FIG. 1 or 2, the mechanical energy accumulator 10 may be wrapped with a cable or wire winding in order adequately secure the lids. This adds strength to the system, and also prevents shrapnel from separating from the mechanical energy accumulator 10 in the event of a collision or accident.

In the present invention, the mechanical energy accumulator 10 has an ability to flex in the event of a collision. In particular, the enclosure is appropriately flexible so that, in the event of a collision, adjacent flywheels will contact each other so as to create a braking effect by the contact of flywheel against flywheel indicating contact at its smallest diameter.

The present invention provides the maximum neutralization of the gyroscopic phenomenon. The sphere form of the three-dimensional flywheel assembly can serve as an energy storage apparatus. It is also possible that various forms could also be used so as to achieve the same neutralization of the gyroscopic phenomenon. The spinning of the flywheels in opposite directions on the same axis serves to neutralize all gyroscopic effects on that axis. The speed of each flywheel should be in synchronism and the weight of each flywheel should be the same. Since the gyroscopic effect is neutralized per plane-axis, then this three-dimensional arrangement adds gyroscopic neutralization to the entire sphere. As such, all possible movements of a moving vehicle or vessel are covered.

The entire unit of the present invention results in a sphere-shaped housing having six flywheels. One or more spheres can be interconnected electrically so as to operate like an electro-mechanical battery. Such a battery can be charged and recharged in an unlimited fashion. This electro-mechanical battery permits regenerative braking, and other leading opportunities, to occur during the operation of the motor vehicle.

As used in the present invention, the flywheels can be made of rings which are of different materials and densities. As such, certain of the rings can act as springs. The rings can be formed in layers of "half-moon" shapes so that in and impact or blow of low intensity, the flywheels will have some "give" in a spring type of absorption. Under normal centrifugal force, the rings will be rigid and remain in place.

Additionally, the flywheel can be hollow or be mercury-filled, or filled with some other liquid. The liquid will allow absorption to an impact force or a strike. If the flywheel does disintegrate, the liquid will allow for a containment of the pieces of the flywheel. A liquid-filled or hollow flywheel will also offer inherent balancing and weight advantages for higher energy storage at given speeds.

The present invention also includes another form of shock absorption by manufacturing the flywheels to distort and to absorb a certain amount of change in angular momentum before disintegrating. The flywheels are formed in rings in which different materials with high strength fiber strands are wound. The rings, upon sufficient rotational force, may slip between themselves. The shaping of the outer diameter of the rings in a channel or circular cupping form allows a small rotation of the outer ring and return to the original shape in a bending yield without damaging themselves or adjacent rings.

Referring to FIG. 3, there is shown a schematic view of an alternative embodiment of the present invention. The alternative embodiment is a flywheel system 50 utilizing a pipe 52 and a plurality of flywheel units 54. A plurality of the flywheel units 54 are positioned within a length of pipe 52. The bearing mounts 56 of the flywheel units 54 are exposed through openings 58 along the length of pipe 52. Aside from the bearing mounts 56, the remainder of the components of the flywheel units 54 are contained within the length of pipe 52. Similar to the configuration of the flywheels described hereinabove, the flywheel units 54 include a first pair of flywheels rotatable about a first axis within the pipe, a second pair of flywheels rotatable about a second axis within the pipe and a third pair of flywheels rotatable about a third axis within the pipe. The first, second and third axes being perpendicular to each other. Alternatively, two pairs of flywheels may be used. Each of the flywheels may have a brushless DC motor thereon. The brushless DC motor may have permanent magnet rotors. The use of the pipe 52 minimizes danger associated with the high speed of the flywheels. Further, the use of the pipe allows for a vacuum to be sustained therein.

The foregoing disclosure and description of the invention is illustrative and explanatory thereof. Various changes in the details of the described apparatus can be made within the scope of the appended claims without departing from the true spirit of the invention. The present invention should only be limited by the following claims and their legal equivalents.

I claim:

1. A mechanical energy accumulator comprising:
   a housing;
   a first pair of flywheels rotatable about a first axis within said housing;
   a second pair of flywheels rotatable about a second axis within said housing;
   a third pair of flywheels rotatable about a third axis within said housing, each flywheel of said first pair of flywheels being rotatable in opposite directions, each flywheel of said second pair of flywheels being rotatable in opposite directions, each flywheel of said third pair of flywheels being rotatable in opposite directions, said first, second and third axes being perpendicular to each other, said housing having openings thereon corresponding respectfully to locations of each of said flywheels; and
   a plurality of lids positioned on said housing respectfully over said openings, each of said plurality of lids having stator windings on an interior thereof, each of said flywheels having rotors formed thereon, the rotors being cooperative respectfully with the stator windings.

2. The mechanical energy accumulator of claim 1, each of the flywheels having a double conical shape.

3. The mechanical energy accumulator of claim 1, further comprising:
   a vacuum valve positioned on an outside of said housing, said vacuum valve in communication with an interior of said housing, said vacuum valve suitable for allowing a vacuum to be created within said housing.

4. A mechanical energy accumulator comprising:
   a housing;
   a first pair of flywheels rotatable about a first axis within said housing;
   a second pair of flywheels rotatable about a second axis within said housing; and
   a third pair of flywheels rotatable about a third axis within said housing, each flywheel of said first pair of flywheels being rotatable in opposite directions, each flywheel of said second pair of flywheels being rotatable in opposite directions, each flywheel of said third pair of flywheels being rotatable in opposite directions, said first, second and third axes being perpendicular to each other;
   a support structure formed interior of said housing; and
   a convergence support formed at a center of said housing, said support structure being connected to said convergence support and to an interior surface of said spherical housing, said support structure forming a frame around each of the flywheels.

5. The mechanical energy accumulator of claim 4, each of the flywheels having a double conical shape wherein a diameter of each of the flywheels increases from a position adjacent said convergence support towards an exterior of said housing, said diameter decreasing toward said housing.

6. A flywheel system comprising:
   a housing having a plurality of openings thereon;
   a plurality of flywheels respectfully positioned in said plurality of openings of said housing, each of said plurality of flywheels having rotors formed thereon adjacent an exterior surface of said housing; and
   a plurality of lids positioned respectfully over said plurality of openings of said housing, each of said plurality of lids having stator windings on an interior side thereof, said stator winding cooperative respectfully with said rotors of said plurality of flywheels.

7. The flywheel system of claim 6, further comprising:
an energy inputting means cooperative with each of said plurality of flywheel lids for supplying electrical energy so as to rotate the flywheel; and
an energy outputting means connected to each of said plurality of flywheel lids for converting the rotation of the flywheels into potential energy.

8. The flywheel system of claim 6, each of said plurality of flywheels having a double conical shape.

9. The flywheel system of claim 6, further comprising:
a vacuum valve positioned on an outside of said housing, said vacuum valve in communication with an interior of said housing, said vacuum valve suitable for allowing a vacuum to be created within said housing.

10. The mechanical energy accumulator of claim 6, further comprising:
a support structure formed interior of said housing; and
a convergence support formed at a center of said housing, said support structure being connected to said convergence support and to an interior surface of said housing, said support structure forming a frame around each of said plurality of flywheels.

11. The flywheel system of claim 6, said plurality of flywheels comprising:
a first pair of flywheels rotatable about a first axis within said housing;
a second pair of flywheels rotatable about a second axis within said housing; and
a third pair of flywheels rotatable about a third axis within said housing, said first, second and third axes being perpendicular to each other.

12. The flywheel system of claim 11, each flywheel of said first pair of flywheels being rotatable in opposite directions, each flywheel of said second pair of flywheels being rotatable in opposite directions, each flywheel of said third pair of flywheels being rotatable in opposite directions.

\* \* \* \* \*